United States Patent Office 3,129,232
Patented Apr. 14, 1964

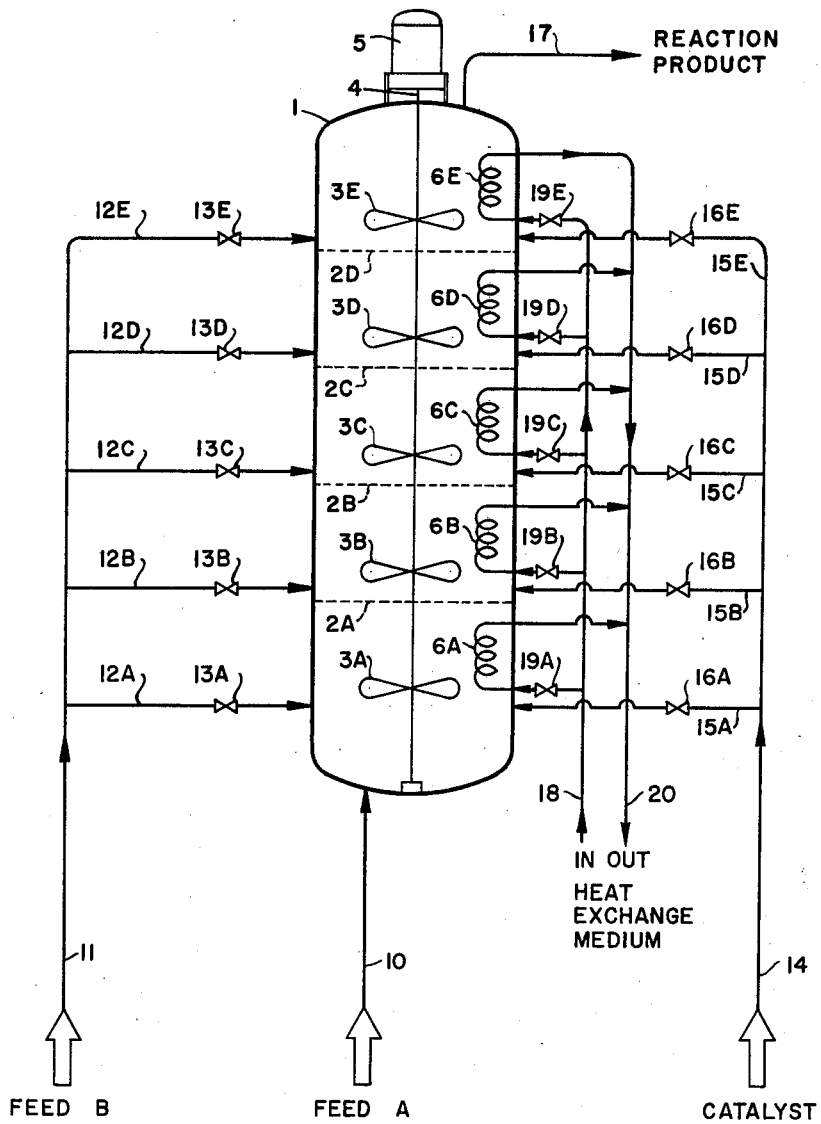

3,129,232
PROCESS FOR CONDENSING EPOXYALKYL HALIDES WITH HYDROXYL GROUP-CONTAINING COMPOUNDS
Henry C. Terford, Houston, and Willis D. Kinney, Pasadena, Tex., assignors to Shell Oil Company, New York, N.Y., a corporation of Delaware
Filed Aug. 8, 1961, Ser. No. 130,013
6 Claims. (Cl. 260—348.6)

This invention is directed to an improved method for carrying out reactions of epoxyalkyl halides and hydroxyl group containing compounds.

It is well known that various epoxyalkyl halides can be reacted in the presence of acid catalysts with various hydroxyl group-containing compounds to form hydroxyhalide ethers which, in turn, can be converted to epoxy ethers. This invention is concerned with an improvement in the first step of these reactions, i.e., the acid catalyzed condensation of epoxyalkyl halides with hydroxyl group-containing compounds. It is generally desired to convert the resulting condensation products to the epoxy ethers, and this can be done by conventional dehydrohalogenation methods or by an improved dehydrohalogenation method disclosed herein.

The above reactions are used for the production of various commercial products, including polyethers of epoxyalkyl halides, such as polyepichlorohydrin; monoepoxy ethers of monohydric alcohols or phenols, such as butyl glycidyl ether or vinyl glycidyl ether; and polyglycidyl ethers of polyhydric alcohols, such as the polyglycidyl ethers of ethylene glycol and of glycerin. In the commercial methods heretofore employed for the production of these materials, the very high exothermicity of the condensation step has been a serious drawback. The reactions are carried out in kettles in which large masses of the reactants are converted. It is necessary in these reactions to maintain close temperature control in order to avoid runaway reactions and to prevent product degradation resulting from maintaining high temperatures for a long period of time. To maintain temperature control, it is the usual practice to add one of the reactants gradually to the reaction mass over a long period of time, generally on the order of many hours.

It is an object of this invention to provide an improved method for carrying out the condensation reaction of epoxyalkyl halides with hydroxyl group-containing compounds. It is a specific object to provide an apparatus and method for carrying out these reactions in short reaction times, substantially below one hour, and at very high throughput rates. A specific object of this invention is to provide improved methods for the production of polyepichlorohydrin, butyl glycidyl ether, phenyl glycidyl ether, allyl glycidyl ether and polyglycidyl ethers of polyhydric alcohols, such as ethylene glycol and glycerine.

These and other objects of this invention, which will appear from the following description, are accomplished by carrying out the condensation reaction in a continuous multistage reaction system in which the hydroxyl group-containing reaction is introduced into the first stage and carried in series through all stages, while the epoxyalkyl halide and the condensation catalyst are introduced at least in part into the first reaction stage and may be introduced in part into one or more of the subsequent reaction stages. Provision is made to prevent backmixing between stages. The reaction is carried out at relatively high temperatures above about 100° C. and with very short reaction times, typically, between 2 and 10 minutes total residence time. The process of this invention will be described in further detail below, in part by reference to the drawing in which the sole figure is a schematic representation of an apparatus suitable for carrying out the condensation reaction according to this invention.

CONDENSATION REACTION

Reactants

*Epoxyalkyl halides.*—The term "epoxyalkyl halide," as used herein, refers to a compound comprising an alkane chain or cycloalkane ring having disposed thereon a vicinal epoxy group (oxirane group) and a halogen atom attached to a chain carbon atom which is not attached to the oxygen atom. Preferred compounds are those wherein the halogen atom is attached to a chain carbon atom which is directly attached to a carbon atom of an epoxy ring, the vic-epoxy ring thus being in the alpha,beta-position relative to the halogen. These compounds have the structure

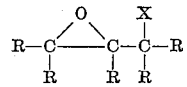

where X is a halogen atom and each R is selected from the group consisting of the hydrogen atom and alkyl groups of up to 4 carbon atoms. Representative compounds include 1-chloro-2,3-epoxypropane (epichlorohydrin); 1-bromo-2,3-epoxypropane (epibromohydrin); 1-chloro-2,3-epoxybutane; 1-iodo-2,3-epoxyhexane; 3-chloro-4,5-epoxyoctane; 1-chloro - 2,3 - epoxycyclohexane; 1-bromo-2,3 - epoxy-3-methylbutane; 2-chloro-2-methyl-3,4-epoxypentane; and the like, preferably having up to 8 carbon atoms per molecule. The most preferred compounds of this class, which combine a terminal halogen atom with a terminal epoxy group, are the epihalohydrin, e.g., epichlorohydrin and epibromohydrin. Because of the preponderant commercial importance of epichlorohydrin, relative to other epoxyalkyl halides, the following description of the invention will be made largely in terms of that compound.

*Hydroxyl group-containing compounds.*—Various types of hydroxyl group-containing compounds are employed, depending on the type of reaction products desired. For example, the conversion of epichlorohydrin to polyepichlorohydrin requires the use of only a very small amount of a hydroxyl group-containing compound, such as water, a polyhydric alcohol, e.g., ethylene glycol or glycerine or of another suitable polyfunctional compound. The repeating section of the polymer resulting from the conversion of epichlorohydrin, when such compounds are used in small amounts as initiators, may be represented by the formula

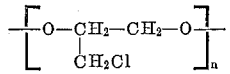

wherein $n$ may be an integer from 2 to about 100 or more.

When substantial amounts of a polyhydric alcohol are reacted with epichlorohydrin, the resulting product, after dehydrohalogenation, is a polyglycidyl ether of these alcohols in which one or several hydroxyl groups are substituted by a glycidoxy group. Suitable starting compounds for these products are glycerin, ethylene glycol, propylene glycol, pentaerythritol and other similar polyhydric alcohols. A typical conversion product of this type is the condensation product of epichlorohydrin with glycerin which, upon dehydrohalogenation leads to a polyglycidyl ether.

In the production of monoepoxy ethers of monhydric hydroxyhydrocarbon compounds, the hydroxyl-containing compound has the general formula ROH, where R is a hydrocarbyl radical. Preferred compounds of this type are selected from monohydric alkanols and monohydric phenols, particularly those where R has up to 12 carbon atoms. Typical alkanols include methanol, ethanol, propanol, isopropanol, butanol, sec-butanol, pentanol, hexanol, cyclohexanol, heptanol, octanol, and the like. Representative phenols include phenol, the cresols, the xylenols, p-tert-butyl phenol, o-ethyl phenol, m-isopropyl phenol, naphthol, and the like. Also effective as hydroxy-hydrocarbon reactants are olefinic alcohols such as allyl alcohol and crotyl alcohol and acetylenic alcohols, e.g., propargyl alcohol.

Catalysts

Among the acidic catalysts suitable for use in the process of this invention, the preferred one is boron trifluoride ($BF_3$) used in the form of $BF_3$ gas. $BF_3$ can also be suitably used in solution in water or as the dihydrate compound. A variety of complexes of $BF_3$ with organic compounds are known and are suitable as catalysts, e.g., $BF_3$-etherate. These complexes in general, however, decompose at temperatures which are lower than the highest temperatures that could otherwise be used in the process of this reaction. The decomposition product may lead to some undesirable by-products. Hence, when a $BF_3$ complex is employed, the reaction temperature is generally in the lower range of that suitable for use in this invention, e.g., between 100 and 125°C., while $BF_3$ gas is suitable at temperatures up to 200° C. Other acidic catalysts which may be employed, if desired, include inorganic acids such as sulfuric acid, phosphoric acid; salts such as tin tetrachloride, and the like.

Reaction Conditions

The reaction is carried out in a continuous multistage reaction system in which the hydroxyl compound is introduced in the first stage and carried, together with reaction products, in series through the remainder of the stages. Catalyst and epoxy alkyl halide are introduced, at least in part, in the first stage and may be introduced in part in subsequent stages. The stages are arranged such that there is no backmixing of reaction mixture from a later to an earlier stage.

The reaction mixture is preferably completely in liquid phase. If desired, a mixed liquid and gas phase may be employed such that in each stage there is at least a substantial amount of liquid present.

Ratios of reactants and catalyst concentrations are generally about the same as those used in similar batch reactions. In the production of polyepichlorohydrin, suitable ratios of epichlorohydrin are from 5 to 100 moles of epichlorohydrin per hydroxyl group, preferably from 7:1 to 15:1 and most preferably from 8:1 to 12:1. In the production of polyglycidyl ethers of polyhydric alcohols suitable ratios are from about 0.6 to about 1.4 and most preferably from about 0.95 to about 1.08 moles epichlorohydrin per hydroxyl group of the polyhydric alcohol. In the production of monoepoxy ethers of monohydric hydroxy hydrocarbon compounds suitable epoxy halide to hydroxyhydrocarbon ratios are from 2:1 to as high as 10:1 and preferably at least about 4:1.

Catalyst concentrations in the production of polyepichlorohydrin are generally in the range from 0.05 to 1.5 percent by weight, based on epichlorohydrin. Product characteristics are sensitive to catalyst concentration. In general, the lowest concentration that provides substantially complete conversion of epichlorohydrin at a given contact time and temperature is preferred. It is especially preferred to operate the reaction with a catalyst concentration which results in a very small amount of unconverted epichlorohydrin, e.g., 0.5 percent by weight, appearing in the reactor effluent. Addition of catalyst and epichlorohydrin to several stages is suitably controlled to provide just enough catalyst to assure reaction completion in the stage upstream from the next epichlorohydrin and catalyst addition point; alternatively, all the catalyst is added with the hydroxyl compound in the first stage.

In the production of polyepoxy ethers of polyhydric alcohols and of monoepoxy ethers of monohydric hydroxy-hydrocarbon, very low catalyst concentrations are sufficient. For example, $BF_3$ catalyst may be used in concentration from about 0.01 to 0.1 percent by weight or higher. A suitable range is from 0.02 to 0.07%. Higher concentrations, especially above about 0.5%, are generally undesirable in the production of the derivatives of polyhydric alcohols.

Reaction time and temperature are closely interrelated. In general, the reaction rates are such that at the relatively high temperatures within the suitable range the reaction is completed in from 2 to 10 minutes. Any residence of the reaction product in the reactor at the elevated temperature after reaction is completed is unnecessary and undesirable because product degradation begins to set in. Temperatures suitable for use in the process of this invention are, in general, in the range of 100° to 200° C. and corresponding reaction times are from 60 minutes to as little as about 2 minutes. Preferred conditions comprise temperatures between 100° and 150° C. and times between 20 and 2 minutes.

Product Dehydrohalogenation

The method used to dehydrohalogenate the condensation product from the continuous reactor may be conventional. Alkaline-acting materials are employed as the dehydrohalogenating agents. These includes, for example, sodium hydroxide, potassium hydroxide, sodium carbonate and potassium carbonate and the corresponding bicarbonates, hydroxides of magnesium, zinc, lead, iron and aluminum and the corresponding oxides, and the like. Aluminates, silicates and zincates of alkaline salts, such as sodium potassium aluminate, sodium or potassium aluminate and sodium or potassium zincate are particularly suitable when used in substantially or completely non-aqueous media.

If it is desired to convert all the vicinal hydroxyl and halogen to vicinal epoxy groups, the amount of alkaline material used in the dehydrohalogenation is at least equivalent to the hydrogen halide content of the condensation product. Less than the equivalent amount of alkaline material may be used if not all of the halohydrin groups are to be converted to the epoxy groups.

The alkaline material may be employed as an aqueous solution or suspension or in solution in an inert solvent, such as ether; aliphatic, cycloaliphatic or aromatic hydrocarbon; halogenated hydrocarbon and the like.

In most cases the dehydrohalogenation reaction is accomplished at temperatures ranging from about 20° C. to 150° C. and preferably from 25° C. to 80° C.

Dehydrohalogenation may be carried out in a conventional batch system. In such a system the condensation product is agitated with the alkaline medium for the required length of time in a kettle provided with agitator and heat exchange surface and then separated from the remaining basic material and catalyst, if any, and the salt resulting from the neutralization. The separation is made by suitable filtration, phase separation, extraction and distillation steps, as is well known to the art.

The dehydrohalogenation may be also carried out in a continuous fashion, e.g., in a backmixed reactor such as an agitated kettle in which product and alkaline reactant are continuously fed into the reactor and agitated at a desired temperature for a required period of time, and the product is continuously withdrawn from the reactor.

Apparatus

An apparatus suitable for use in the process of this invention is diagrammatically illustrated in the sole figure of the drawing. The apparatus consists of a tower or column containing a multiple number of superimposed reaction stages. In the illustrated reactor there are five stages formed by the reactor walls and four plates, trays or discs 2 (2A–2D). Each tray is equipped with means to permit upward flow of the reaction mixture as additional reactants are pumped into the tower, while permitting little or no downward flow from one stage to the next. For example, each tray may contain one or a plurality of openings of suitable size, each provided with a check valve to prevent backflow. Each reaction stage is provided with stirring means, such as suitable propellers 3 (3A–3E), suitably driven from a single shaft 4, moved by a prime mover 5. Preferably each reaction stage is supplied with independent heat transfer means, such as diagrammatically shown by coils 6. Jacketing may be substituted for coils or used in combination therewith. Each reaction stage is also provided with sufficient openings to provide for feed injection, measurement of temperature and/or other desired variables, and relief facilities. Proper instrumentations and relief facilities can be readily provided as needed and are not illustrated on the drawing.

Provision is made for charging the hydroxyl group-containing compound to the bottom of the reactor, as feed A, through line 10. The epoxy alkyl halide is charged as feed B through line 11, which has branch lines 12 leading to the individual stages of the reaction zone. The flow through each branch line is controlled by a separate valve 13. Catalyst is brought in via line 14, which has branch line 15 leading to each of the reaction zone stages. Each branch line is controlled by a valve 16. Reaction product leaves the final reaction stage via outflow line 17.

Heat exchange medium, such as cooling water for cooling purposes, or steam or hot water for heating purposes, enters via line 18; flow to coils 6 is controlled by valves 19. Heat exchange medium is withdrawn from the system by line 20.

In continuous operation of the process, hydroxyl group-containing compound is continuously passed to the first stage of the reactor, i.e., the bottom chamber thereof. Epoxy alkyl halide compound is continuously passed to at least two of the reaction stages. For example, half of the epoxy alkyl halide may enter via line 12A and half via line 12C. In that case, valves 13B, 13D and 13E are closed and valves 13A and 13C are manipulated to provide the desired ratio. In that case, catalyst is preferably also passed in part to the bottom reaction stage via line 15A controlled by valve 16A and part to the third stage via line 15C controlled by valve 16C; valves 16B, 16D and 16E are closed. As the result of this operation a substantial part of the reaction takes place in the first reaction stage and the reaction continues as the reaction mixture passes up into the second reaction stage. As the product then passes into the third reaction stage the additional epoxy alkyl halide and catalyst causes further reaction, and this additional reaction continues in the fourth and fifth stages.

Reaction product withdrawn via line 17 may be cooled, washed or filtered to remove residual catalyst if necessary, and stored or used as such, or it may be dehydrohalogenated, e.g. in conventional manner by contact with alkaline material, to produce an epoxy ether product.

It will be readily apparent that the illustrated apparatus lends itself to a variety of modes of operation. For example, the flow of epoxy alkyl halide and of catalyst to the various reaction zones may be controlled, if desired, to achieve particular results. The valves controlling the flow of these reagents, as well as the valves controlling the flow of heat exchange medium, may be manipulated manually or they may be manipulated automatically in response to reaction variables such as, for example, the temperature in the various stages of the reaction zone. In such an operation, if the temperature begins to rise in one of the reaction stages the flow of cooling medium in the heat exchange means may be increased until it is at the maximum rate and, if the temperature is still higher than desired, the flow of epoxy alkyl halide to the zone or to a preceding zone may be reduced to maintain the desired maximum temperature. The addition of catalyst may be controlled, for example, in response to analysis of catalyst content in the reactor outflow or in the product in any given zone. Numerous modifications of this kind will occur to the skilled chemical engineer.

It will also be apparent that the process of this invention may be carried out in apparatus which is different from that illustrated in the drawing. For example, the reactor may contain as few as three stages or as many as ten or more, if desired. The apparatus may be modified to provide for addition of epoxy alkyl halide feed to less than all of the reaction zone stages. It may be modified by having completely separate heat exchange circuits for each of the reaction zones or for several sets of two or more reaction zones. It may be modified by having different types of agitation in the several reaction zones. While it is preferred to have the reactor arranged as a vertical column, it is also possible to carry out the reaction in a multiplicity of successive horizontally placed reaction zones or in separate staged vessels. In order to obtain the full advantage of this invention, however, it is desired to have the successive reaction zones arranged in a single vessel in order to permit the fastest possible throughput, thus obtaining maximum usage of the equipment and avoiding product degradation due to residence time at elevated temperatures.

The reactor illustrated in the drawing is suitably manufactured as either a single shell with provision for inserting the desired trays or as a series of flanged pipe sections in which the trays can then be inserted or moved as desired between sections.

Contrasted with conventional equipment, the continuous reactor used according to this invention permits surprisingly large production in relatively small equipment. For example, a five stage reactor of one foot diameter and twelve foot height, which has about 70 gallon capacity, can produce up to 20,000 pounds per hour of condensation reaction product. As a further example, the condensation reaction product of glycerin and epichlorohydrin is commercially produced in batch reaction in 1,500 gallon jacketed kettles at a production rate of 900 pounds per hour. A similar production rate is obtained according to this invention in a continuous reactor having only a 9 gallon capacity.

The following example illustrates the use of this invention in the production of the dehydrochlorinated reaction product of glycerin and epichlorohydrin at a series of varying conditions.

A condensation product of glycerin and epichlorohydrin is produced in a 6 ft. x 6 inch I.D. reactor of the type illustrated in the drawing. Feed A, a mixture or complex resulting from mixing $BF_3$ gas with glycerin in a mixer, not shown, is charged to the first reaction stage on flow control. Feed B, epichlorohydrin, is charged to each reaction stage on flow control. To start the reaction, feed A and feed B are charged to the first stage only and the mixture is heated by passing steam through coil 6A. When the reaction begins, coil 6A is used to withdraw heat to maintain the desired reaction temperature. As the product passes up through the reactor, addition of epichlorohydrin to the remaining stages is started and cooling water is passed through coils 6 to withdraw heat of reaction.

The reaction product withdrawn via line 17 is dehydrochlorinated by diluting it with an equal weight of a suitable ketone solvent, adding 1.5 moles of NaOH as 45% aqueous NaOH per mole of saponifiable chlorine over a 45 minute period at 20° C., agitating an additional 45 minutes, settling, removing the brine layer and washing it with ketone neutralizing the combined organic phases with $CO_2$, and stabilizing to terminal conditions at 85° C. at about 15 mm. mercury for about 15 minutes.

The reaction is carried out in a series of runs at temperatures from 70° to 165° C., residence times from 5.8 to 51 minutes, epichlorohydrin to glycerin mole ratios from 2.13:1 to 3.24:1 and $BF_3$ concentration from 0.025 to 0.5 percent by weight, based on epichlorohydrin.

Analyses of dehydrochlorinated product produced at typical conditions in these ranges are as follows:

| | | | | | | |
|---|---|---|---|---|---|---|
| Temperature, °C | 70 | 150 | 93 | 157 | 143 | 165 |
| Residence time, minutes | 51 | 51 | 18 | 18 | 5.8 | 5.8 |
| Mole ratio, epichlorohydrin to glycerin | 3 | 3 | 3 | 3 | 3 | 3 |
| Catalyst concentration, $BF_3$, percent wt | 0.5 | 0.5 | 0.05 | 0.05 | 0.05 | 0.05 |
| Dehydrochlorinated Product: | | | | | | |
| Weight per epoxy group | 157 | 159 | 153 | 170 | 150 | 149 |
| Molecular weight, Mn | 309 | 333 | 329 | 351 | 315 | 357 |
| Color (Gardner) | 1− | 2−3 | 2+ | 4−5 | 2−3 | 5 |
| Viscosity (Gardner) | D−E | D | D+ | F | D | E |
| Total chlorine, percent wt. | 15.5 | 13.0 | 12.5 | 13.7 | 12.1 | Ca 13 |

We claim as our invention:

1. In the production of glycidyl ethers in which
    (1) a hydroxyl-group-containing compound selected from the group consisting of water, monohydric alkanols, polyhydric alkanols, monohydric phenols, and polyhydric phenols, whose hydroxyl groups are capable of reacting with the epoxide group of epichlorohydrin, is reacted with a predetermined amount of
    (2) epichlorohydrin, in the presence of
    (3) an acidic catalyst selected from the group consisting of boron trifluoride, complexes of boron trifluoride, inorganic acids and salts,
the improvement which consists of carrying out the reaction in a reaction zone consisting of at least three reaction stages arranged for product flow in series without backmixing between stages, in the following manner:
    (a) continuously passing said hydroxyl-group-containing compound exclusively into the first stage of said reaction zone,
    (b) passing at least a substantial portion of epichlorohydrin and catalyst into said first reaction stage,
    (c) passing the reaction mixture from each stage into the following stage,
    (d) passing the remainder of epichlorohydrin and catalyst into at least one additional reaction stage,
    (e) maintaining the temperature in each stage between 100° C. and 200° C. by indirect heat removal, and
    (f) controlling the rate of flow through said reaction zone such that the contact time therein is in the range from 2 minutes to 60 minutes and does not substantially exceed the time required for completion of reaction at the temperature employed.

2. In the production of condensation product of glycerin and epichlorohydrin, the improvement which consists of carrying out the reaction by contact with boron trifluoride catalyst in a reaction zone consisting of at least three reaction stages arranged for product flow in series without backmixing between stages, in the following manner:
    (a) continuously passing glycerin exclusively into the first stage of said reaction zone,
    (b) passing at least half of the required amount of epichlorohydrin into said first stage, together with sufficient $BF_3$ to catalyze the reaction between glycerine and epichlorohydrin,
    (c) passing the reaction mixture from each stage into the following stage,
    (d) passing the remainder of epichlorohydrin and catalyst into at least one additional reaction stage,
    (e) maintaining the temperature in each stage between 100° C. and 200° C. by indirect heat removal, and
    (f) controlling the rate of flow through said reaction zone such that the contact time therein is in the range from 2 minutes to 60 minutes and does not substantially exceed the time required for completion of reaction at the temperature employed.

3. The process according to claim 1 in which said hydroxyl-containing compound is water.

4. The process according to claim 1 in which said hydroxyl containing compound is a polyhydric alkanol.

5. The process according to claim 1 in which said hydroxyl-containing compound is a monohydric alkanol.

6. The process according to claim 1 in which said hydroxyl-containing compound is a phenolic hydrocarbon.

References Cited in the file of this patent

UNITED STATES PATENTS

| | | |
|---|---|---|
| 2,714,123 | Johnson | July 26, 1955 |
| 2,898,349 | Zuppinger et al. | Aug. 4, 1959 |

FOREIGN PATENTS

| | | |
|---|---|---|
| 785,415 | Great Britain | Oct. 30, 1957 |